United States Patent
Park

(10) Patent No.: US 10,747,937 B2
(45) Date of Patent: Aug. 18, 2020

(54) METHOD FOR LAYOUT DESIGN AND SEMICONDUCTOR DEVICE MANUFACTURED BASED ON THE SAME

(71) Applicant: Samsung Electronics Co., Ltd., Suwon-si, Gyeonggi-do (KR)

(72) Inventor: Jinyoung Park, Gunpo-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/108,260

(22) Filed: Aug. 22, 2018

(65) Prior Publication Data

US 2019/0236238 A1    Aug. 1, 2019

(30) Foreign Application Priority Data

Jan. 31, 2018   (KR) .......................... 10-2018-0012101

(51) Int. Cl.
  *G06F 30/398*   (2020.01)
  *G06F 30/392*   (2020.01)
  *G06F 119/18*   (2020.01)

(52) U.S. Cl.
  CPC .......... *G06F 30/398* (2020.01); *G06F 30/392* (2020.01); *G06F 2119/18* (2020.01)

(58) Field of Classification Search
  CPC ............. G06F 17/5081; G06F 17/5072; G06F 2217/12; G06F 30/398; G06F 30/392; G06F 2119/18
  See application file for complete search history.

(56) References Cited

U.S. PATENT DOCUMENTS

| 6,323,113 | B1 * | 11/2001 | Gabriel | ............ | H01L 21/76229 |
| | | | | | 257/207 |
| 6,680,539 | B2 | 1/2004 | Nohsoh et al. | | |
| 7,392,496 | B1 * | 6/2008 | Schultz | ............... | G06F 17/5068 |
| | | | | | 716/113 |
| 7,694,258 | B1 * | 4/2010 | Ylinen | .............. | H01L 21/76819 |
| | | | | | 716/119 |
| 7,725,859 | B1 | 5/2010 | Lenahan et al. | | |
| 8,024,673 | B2 | 9/2011 | Nitta | | |
| 8,024,677 | B2 | 9/2011 | Lenahan et al. | | |
| 8,397,196 | B2 | 3/2013 | Tetelbaum | | |
| 8,647,893 | B1 * | 2/2014 | Agarwal | ............ | G06F 17/5081 |
| | | | | | 257/E21.522 |

(Continued)

FOREIGN PATENT DOCUMENTS

JP      2009032762 A   2/2009
JP      4799858 B2    10/2011

(Continued)

*Primary Examiner* — Nha T Nguyen

(74) *Attorney, Agent, or Firm* — Harness, Dickey & Pierce, P.L.C.

(57) ABSTRACT

Disclosed is a computer-readable medium including a program code. The program code, when executed by a processor, causes the processor to place an electrically active pattern having a first width and a first least margin area, on a layer, to place a first dummy pattern having a second width wider than the first width and having a second least margin area, on the layer, and to place a second dummy pattern having a third width and a third least margin area, on the layer, based on whether a ratio of an area of the layer to areas of the electrically active pattern and the first dummy pattern is within a reference range.

17 Claims, 16 Drawing Sheets

(56) References Cited

U.S. PATENT DOCUMENTS

| | | | | |
|---|---|---|---|---|
| 8,713,507 B1* | 4/2014 | Noice | ............... | G06F 17/5068 716/111 |
| 8,832,623 B1* | 9/2014 | Yuan | ............... | G06F 17/5081 716/112 |
| 9,436,787 B2* | 9/2016 | Lin | ............... | G06F 17/5068 |
| 9,594,862 B2* | 3/2017 | Lin | ............... | G06F 17/5068 |
| 10,170,276 B2* | 1/2019 | Lin | ............... | H01J 37/3174 |
| 2002/0116686 A1* | 8/2002 | Shin | ............... | H01L 21/76819 716/55 |
| 2004/0083438 A1* | 4/2004 | Ohba | ............... | G06F 17/5068 716/122 |
| 2005/0064634 A1* | 3/2005 | Schmidt | ............... | B81C 1/00539 438/183 |
| 2006/0223304 A1* | 10/2006 | Suga | ............... | G06F 17/5068 438/622 |
| 2007/0287200 A1* | 12/2007 | Anderson | ............... | H01L 21/2686 438/7 |
| 2008/0120586 A1* | 5/2008 | Hoerold | ............... | G06F 17/5068 716/52 |
| 2008/0121939 A1* | 5/2008 | Murray | ............... | G03F 1/36 257/202 |
| 2008/0203589 A1* | 8/2008 | Bailey | ............... | G06F 17/5068 257/797 |
| 2009/0031267 A1 | 1/2009 | Ueki | | |
| 2009/0044164 A1* | 2/2009 | Lee | ............... | G03F 1/36 716/119 |
| 2009/0089732 A1* | 4/2009 | van Adrichem | ............... | G06F 17/5068 716/119 |
| 2010/0041232 A1* | 2/2010 | Summerfelt | ............... | G06F 17/5068 438/669 |
| 2011/0016443 A1* | 1/2011 | Fu | ............... | G06F 17/5068 716/108 |
| 2012/0047472 A1* | 2/2012 | Fukuda | ............... | G06F 17/5081 716/52 |
| 2012/0144361 A1* | 6/2012 | Cheng | ............... | G06F 17/5068 716/132 |
| 2012/0306106 A1* | 12/2012 | Takada | ............... | H01L 21/3212 257/784 |
| 2013/0183832 A1* | 7/2013 | Landis | ............... | G03F 1/36 438/758 |
| 2015/0140478 A1* | 5/2015 | Chen | ............... | G03F 1/36 430/5 |
| 2015/0294057 A1* | 10/2015 | Lin | ............... | G06F 17/5068 716/54 |
| 2017/0132348 A1* | 5/2017 | Somashekar | ............... | G06F 17/5072 |
| 2017/0365675 A1* | 12/2017 | Chang | ............... | H01L 21/32139 |

FOREIGN PATENT DOCUMENTS

| | | |
|---|---|---|
| JP | 2014236041 A | 12/2014 |
| JP | 5737044 B2 | 6/2015 |

* cited by examiner

METHOD FOR LAYOUT DESIGN AND SEMICONDUCTOR DEVICE MANUFACTURED BASED ON THE SAME

CROSS-REFERENCE TO RELATED APPLICATIONS

This application claims priority under 35 U.S.C. § 119 to Korean Patent Application No. 10-2018-0012101 filed on Jan. 31, 2018, in the Korean Intellectual Property Office, the disclosure of which is incorporated by reference herein in their entireties.

BACKGROUND

Embodiments of inventive concepts relate to a semiconductor device, and more particularly, relate to a method of designing a layout of a semiconductor device by using an adaptive metal fill.

In addition, the embodiments of inventive concepts relate to a computer program performing an adaptive metal fill and a semiconductor device manufactured by the computer program.

In general, a semiconductor chip may include cells (e.g., transistors) and may include interconnections electrically connecting the cells for the purpose of implementing logic that performs a specific function. The interconnections may be placed over a plurality of layers. In particular, since high integration of a semiconductor chip make manually placing cells and interconnections difficult or impossible, a layout design tool is widely used.

A metal density of interconnections is very important upon placing interconnections in the plurality of layers. For example, if the metal density is not uniform over layers and/or the metal density is out of a range intended by a semiconductor manufacturer, distortion may occur in the process of stacking layers, thereby causing a change in timing of a signal or the like and/or having an influence on semiconductor manufacturing yield. Therefore, a method of inserting a dummy metal is mainly used to make the metal density uniform over layers.

However, as microfabrication technologies develop, even though a metal fill is performed by using a dummy pattern forming rule stored in an existing library, implementing the desired metal density is difficult or impossible. If the desired metal density is not implemented, in the worst case, there may be a requirement to again design a layout, thereby causing an increase in costs and time for development. Therefore, there is a desire for a method of implementing an effective metal fill by using the layout design tool.

SUMMARY

Embodiments of inventive concepts provide a method of preventing, or reducing the likelihood of, a layout from being again designed unnecessarily as the event that a metal density condition is not satisfied frequently occurs as microfabrication technologies develop.

In addition, the embodiments of inventive concepts provide a computer program performing an adaptive metal fill and a semiconductor device manufactured by the computer program.

According to some example embodiments, a computer-readable medium includes a program code that, when executed by a processor, causes the processor to: place, on a layer, an electrically active pattern having a first width and a first least margin area, place, on the layer, a first dummy pattern having a second width wider than the first width and having a second least margin area, and in response to a first ratio of an area of the layer to a sum of areas of the electrically active pattern and the first dummy pattern being outside of a reference range, place, on the layer, a second dummy pattern having a third width and a third least margin area, wherein the third width is the same as or wider than the first width and is narrower than the second width.

According to some example embodiments, a method includes placing, on a layer, an electrically active pattern having a first width and a first least margin area, by using a layout design tool, placing, on the layer, a first dummy pattern having a second width wider than the first width and having a second least margin area, by using the layout design tool, placing, on the layer, a second dummy pattern having a third width and a third least margin area, in response to a first ratio of an area of the layer to a sum of areas of the electrically active pattern and the first dummy pattern being outside a reference range, by using the layout design tool, generating a mask based on a layout including the electrically active pattern, the first dummy pattern, and the second dummy pattern, and manufacturing a semiconductor device by using the mask. The third width is the same as or wider than the first width and is narrower than the second width.

According to some example embodiments, a computer-readable medium includes a program code that, when executed by a processor, causes the processor to place, on a layer, an electrically active pattern having a first width, place, on the layer, a first dummy pattern having a second width wider than the first width, determine whether a ratio of an area of the layer to a sum of areas of the electrically active pattern and the first dummy pattern is within a reference range, and place, on the layer, a second dummy pattern having a third width, which is the same as or wider than the first width and is narrower than the second width, in response to the determining.

BRIEF DESCRIPTION OF THE FIGURES

The above and other objects and features of inventive concepts will become apparent by describing in detail example embodiments thereof with reference to the accompanying drawings.

DETAILED DESCRIPTION OF EXAMPLE EMBODIMENTS

Below, embodiments of inventive concepts may be described in detail and clearly to such an extent that one of ordinary skill in the art may implement inventive concepts.

Components described in the detailed description with reference to terms "part", "unit", "module", etc. and function blocks illustrated in drawings may be implemented with software, hardware, or a combination thereof. In an example embodiment, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
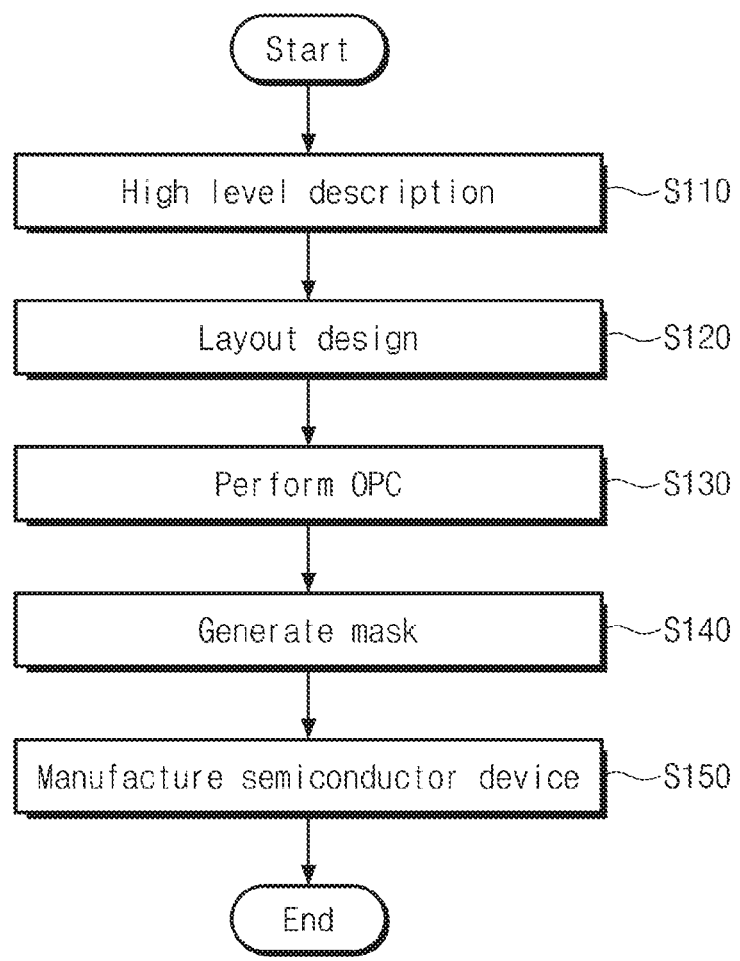
FIG. 1 is a flowchart illustrating a method of designing and manufacturing a semiconductor device according to an example embodiment of inventive concepts.

FIG. 1 is a flowchart illustrating a method of designing and manufacturing a semiconductor device according to an example embodiment of inventive concepts.

In operation S110, a high-level design of a semiconductor integrated circuit may be performed. The high-level design may include designing an integrated circuit corresponding to a design target described with a high-level language of a hardware description language (HDL). For example, the high-level language such as C language may be used in the high-level design process. Circuits designed by the high-level design may be specifically expressed using register transfer level (RTL) coding and/or simulation.

In addition, a code generated by the RTL coding may be converted into a netlist, and the netlist may be synthesized to an entire semiconductor device. The synthesized schematic circuit may be verified by a simulation tool, and an adjustment process may be performed based on a result of the verification.

In operation S120, a layout design process may be performed to implement a logic semiconductor integrated circuit on a substrate, such as a silicon substrate. For example, the layout design may be performed based on the schematic circuit synthesized in the high-level design process and/or the netlist corresponding to the schematic circuit. The layout design process may include a routing process of placing and connecting various standard cells provided from a cell library, based on a prescribed design rule.

A cell library for expressing a circuit of a specific gate-level as a layout may be defined in a layout design tool. The layout process may include the procedure of defining or describing the sizes or shapes of patterns constituting transistors and conductive lines to be formed on a silicon substrate. For example, to form an inverter circuit on the substrate, layout patterns such as a PMOS transistor, an NMOS transistor, an N-well, a gate electrode, and conductive lines to be placed thereon may be appropriately placed. To this end, layout design may include searching and selecting an appropriate one(s) of inverters previously defined in a cell library may be searched and selected.

Afterwards, the routing process may be performed on the selected and placed standard cells. Most of a series of processes described above may be automatically performed by the layout design tool or may be manually performed. For example, the routing may include placing real patterns, or electrically significant or electrically active patterns, in a plurality of layers to be formed on standard cells. In addition, the routing may include placing a dummy pattern, e.g. a pattern that is not intended to be electrically active or significant during operation of the semiconductor device. A dummy pattern may help to improve planarization uniformity during a polishing process used in the manufacture of the semiconductor device; for example, a dummy pattern may help to improve uniformity during a Chemical Mechanical Planarization (CMP) process.

Placing a dummy pattern in a layer may be associated with a ratio (hereinafter referred to as a "metal density") of the area of an electrically active pattern to the layer area. If metal densities are irregular over layers and/or a metal density of a specific layer is less than or greater than a reference, a sharp change in metal densities of layers may cause various issues. Therefore, there is a desire or need to distribute metal densities of layers within a given range, e.g. a range defined by a semiconductor manufacturer.

However, miniaturization of semiconductor devices may make inserting dummy patterns into an empty space of a layer may be difficult or challenging. According to inventive concepts, a metal density condition may be satisfied by performing the routing using dummy patterns of various sizes. For example, as a first metal fill, dummy patterns having a wide width may be placed in a layer in compliance with a dummy pattern forming rule. If the metal density condition is not satisfied even though the dummy patterns are placed as the first metal fill, dummy patterns having a narrow width may additionally be placed in a layer.

After the routing process, verification may be performed on the layout to verify whether the design includes a portion violating in a design rule. For example, the verification process includes design rule check (DRC) for verifying whether a layout meets the design rule, electrical rule check (ERC) for verifying whether a layout is properly connected to each other without electrical disconnection, and layout vs. schematic (LVS) for determining whether the layout is matched with a gate-level netlist, etc.

In operation S130, optical proximity correction (OPC) process may be performed. Layout patterns obtained through the layout design may be implemented on a silicon substrate by a photolithography process. Here, the OPC process may refer to a technique for correcting the distortion occurring in the photolithography process. For example, the distortion such as refraction due to a characteristic of light in an exposure process using the designed layout pattern, or the process effects may be corrected or reduced in impact through the OPC. Shapes and positions of the designed layout patterns may be finely changed while performing the OPC.

In operation S140, photomasks may be manufactured based on the layout changed by the OPC process. For example, the photomasks may be manufactured by patterning a chromium layer provided on a glass substrate on the basis of the data of the layout patterns. For example, one or more masks may be used for each layer.

In operation S150, a semiconductor device may be manufactured using the manufactured photomasks. In the process of manufacturing the semiconductor device by using the photomasks, various exposure processes and etching processes may be repeatedly performed. Through such processes, patterns defined by the layout design may be sequentially formed on the silicon substrate.

Figure 2A:
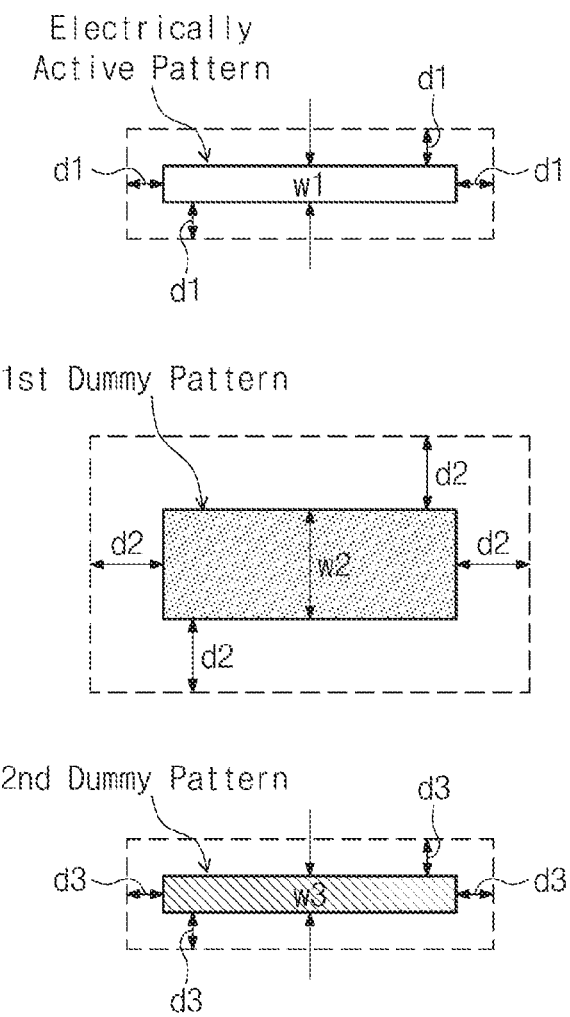
FIGS. 2A and 2B are conceptual diagrams illustrating various kinds of patterns that are used in a layout design process of FIG. 1.
Figure 2B:
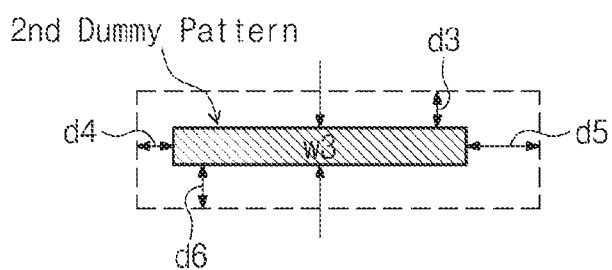

FIGS. 2A and 2B are conceptual diagrams illustrating various kinds of patterns that are used in a layout design process of FIG. 1. Patterns that are used in the layout design process of inventive concepts include an electrically active pattern, a first dummy pattern, and a second dummy pattern.

First, referring to FIG. 2A, the electrically active pattern, the first dummy pattern, and the second dummy pattern may be virtual patterns that are used in the layout design tool. As described above, the electrically active pattern may correspond to a metal interconnection through which an electrical signal is to be transmitted, and the first dummy pattern and the second dummy pattern may correspond to a metal interconnection for satisfying a metal density.

The electrically active pattern may have a width w1 in a direction that is perpendicular to a direction in which the electrically active pattern extends. For example, the width w1 of the electrically active pattern may be determined in consideration of the resolution of the process of manufacturing a semiconductor device. For example, the resolution of the semiconductor device may be associated with an etching process using a photoresist.

Meanwhile, the electrically active pattern may have a least margin area illustrated as being surrounded by a dotted line. The least margin area indicates a least area that has no influence on adjacent interconnections upon forming, on a substrate, a metal interconnection corresponding to the electrically active pattern on a wafer. That is, another metal interconnection is not or does not have to be placed within the least margin area. In the case where another metal interconnection is placed within the least margin area in the semiconductor manufacturing process, a metal interconnection corresponding to the electrically active pattern and another metal interconnection adjacent to the metal interconnection may influence each other. For example, such mutual influence may cause a change in a parasitic capacitance, a change in timing of a signal, a distortion of a signal, etc.

For example, the least margin area of the electrically active pattern may correspond to an area that is defined by moving four sides of the electrically active pattern in left, right, up, and down directions by "d1" (or may correspond to an area within "d1" from an outline of the electrically active pattern). For example, a length/width d1 from the outline (or each side) of the electrically active pattern may be the same as or different from the width w1 of the electrically active pattern. For example, a width of the least margin area of the electrically active pattern may correspond to a sum of the width w1 of the electrically active pattern and "2×d1", i.e. twice the extension length "d1".

The first dummy pattern may have a width w2 in a direction that is perpendicular to a direction in which the first dummy pattern extends. For example, a width w2 of the first dummy pattern may be larger than the width w1 of the electrically active pattern. Likewise, the first dummy pattern may have a least margin area illustrated as being surrounded by a dotted line. The least margin area of the first dummy pattern may correspond to an area that is defined by moving four sides of the first dummy pattern in left, right, up, and down directions by "d2". For example, "d2" may be greater than "d1". For example, a width of the least margin area of the first dummy pattern may correspond to a sum of the width w2 of the first dummy pattern and "2×d2".

The second dummy pattern may have a width w3 in a direction that is perpendicular to a direction in which the second dummy pattern extends. For example, the width w3 of the second dummy pattern may be smaller than the width w2 of the first dummy pattern and may be the same as or larger than the width w1 of the electrically active pattern. Likewise, the second dummy pattern may have a least margin area illustrated as being surrounded by a dotted line. The least margin area of the second dummy pattern may correspond to an area that is defined by moving four sides of the second dummy pattern in left, right, up, and down directions by "d3". For example, "d3" may be smaller than "d2" and may be the same as or greater than "d1". For example, a width of the least margin area of the second dummy pattern may correspond to a sum of the width w3 of the second dummy pattern and "2×d3".

However, distances from four sides (or outline) of the second dummy pattern to the least margin area of the second dummy pattern may be different from each other. Such an example embodiment is illustrated in FIG. 2B.

Referring to FIG. 2B, a distance in an up direction from an outline of the second dummy pattern to the least margin area of the second dummy pattern is "d3". A distance in a left direction from the outline of the second dummy pattern to the least margin area of the second dummy pattern is "d4". A distance in a right direction from the outline of the second dummy pattern to the least margin area of the second dummy pattern is "d5". A distance in a down direction from the outline of the second dummy pattern to the least margin area of the second dummy pattern is "d6".

In this case, "d3", "d4", "d5", and "d6" may be greater or less than "d1" of FIG. 2A. Also, some of "d3", "d4", "d5", and "d6" may have the same value or may have different values.

Electrically active patterns corresponding to metal interconnections of layers are first placed in a normal design phase using the layout design tool. Afterwards, the first dummy patterns are placed in spaces between the electrically active patterns for the purpose of satisfying a metal density of a desired range. That is, the first metal fill is performed. However, even though the first metal fill is performed, satisfying the metal density in the desired range due to miniaturization of semiconductor devices may be very difficult. In this case, according to inventive concepts, the second dummy patterns described above may be placed between the electrically active patterns, between the first dummy patterns, and/or between the electrically active pattern and the first dummy pattern. For example, a second metal fill is performed.

Meanwhile, dummy patterns are illustrated in FIGS. 2A and 2B in the form of a stripe having a given width w2 or w3. For example, the first dummy pattern and/or the second dummy pattern may be formed to have various shapes of polygons.

Figure 3:
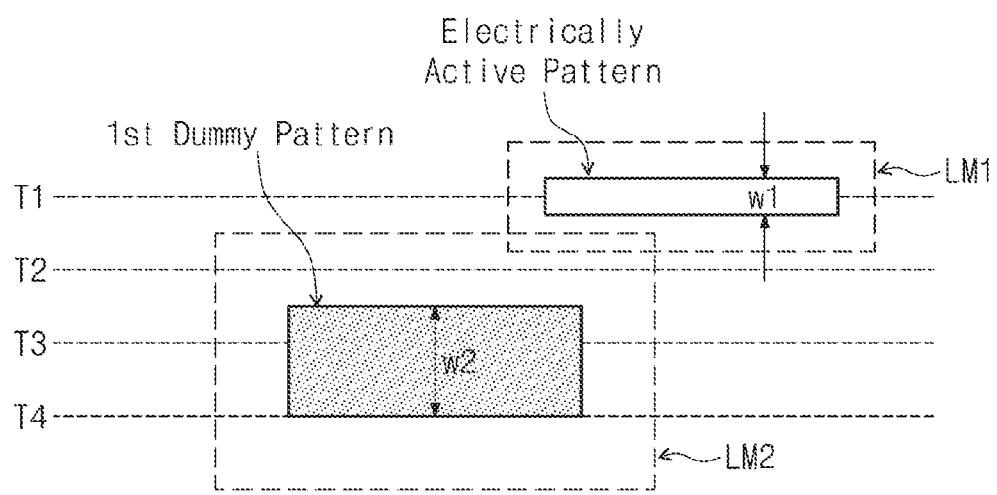
FIGS. 3 to 5 are views conceptually illustrating a least margin condition to be applied upon designing a layout of a semiconductor device.
Figure 4:
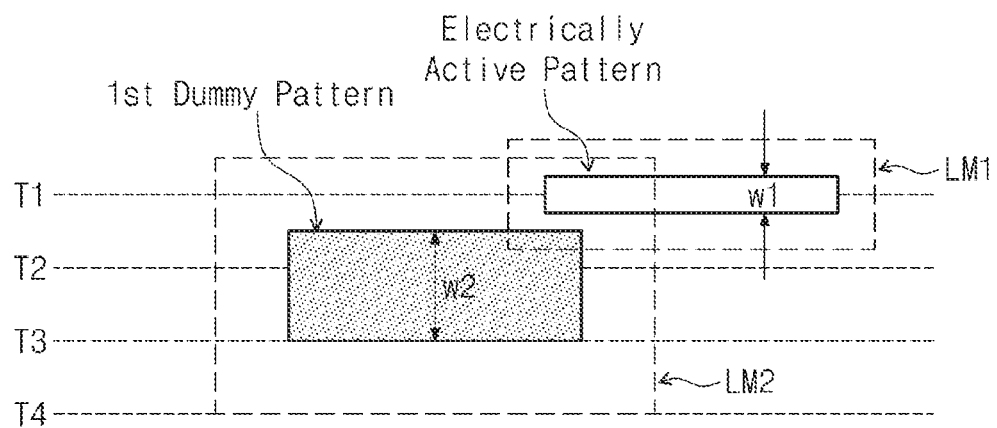
Figure 5:
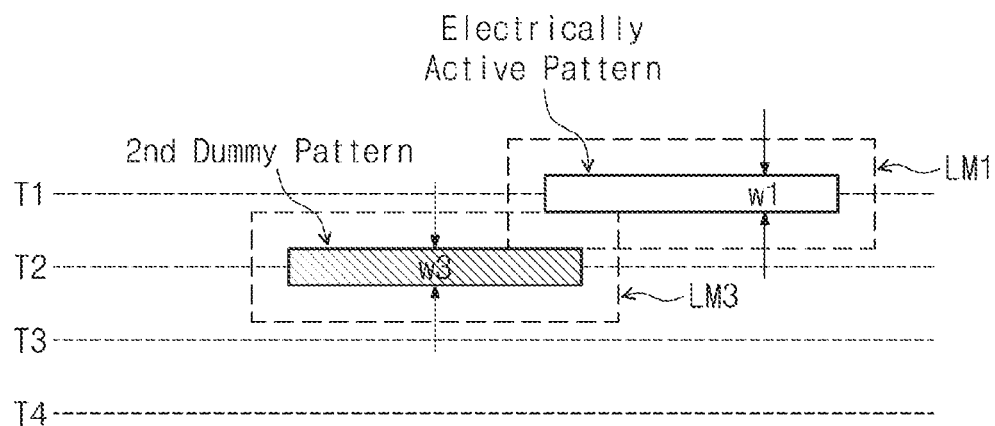

FIGS. 3 to 5 are views conceptually illustrating a least margin condition to be applied upon designing a layout of a semiconductor device. T1 to T4 illustrated in FIGS. 3 to 5 indicate virtual routing tracks. An electrically active pattern and a dummy pattern may be placed along a routing track. However, inventive concepts are not limited thereto. For example, an electrically active pattern may be placed in a direction that is perpendicular to the routing tracks T1 to T4. In addition, dummy patterns may be placed over one or more routing tracks depending on the size of each of the dummy patterns.

Referring to FIG. 3, an electrically active pattern is placed on the first routing track T1, and a first dummy pattern is placed over the third routing track T3 and the fourth routing track T4. In detail, the first dummy pattern is in contact with, or abuts, the fourth routing track T4. As described with reference to FIGS. 2A and 2B, a least margin area LM1 of the electrically active pattern indicates an area that is defined by moving four sides of the electrically active pattern in left, right, up, and down directions by "d1", and a least margin area LM2 of the first dummy pattern indicates an area that is defined by moving four sides of the first dummy pattern in left, right, up, and down directions by "d2".

Since the least margin area LM2 of the dummy pattern does not violate, or intersect, the electrically active pattern, the placement of the first dummy pattern is allowed. In this case, even though the first dummy pattern moves from side to side along the third routing track T3 and the fourth routing track T4, the least margin area LM2 does not intersect the electrically active pattern.

The first dummy pattern is assumed to be placed over the second routing track T2 and the third routing track T3 due to other surrounding patterns. An issue occurring under the above assumption is illustrated in FIG. 4. Referring to FIG. 4, the electrically active pattern is placed on the first routing track T1, and the first dummy pattern is placed over the second routing track T2 and the third routing track T3.

In this case, the least margin area LM2 of the first dummy pattern intersects the electrically active pattern. The least margin area LM1 of the electrically active pattern intersects the first dummy pattern. Actually, even though the electrically active pattern and the first dummy pattern are not in contact with each other, an electrical signal transferred through the electrically active pattern may be affected due to various causes such as a resolution of manufacturing process and a change of a parasitic capacitance. A first metal fill in which the first dummy pattern is placed over the second routing track T2 and the third routing track T3 is not allowed.

Referring to FIG. 5, the electrically active pattern is placed on the first routing track T1, and a second dummy pattern is placed over the second routing track T2. As described with reference to FIGS. 2A and 2B, a least margin area LM3 of the second dummy pattern indicates an area that is defined by moving four sides of the second dummy pattern in left, right, up, and down directions by "d3".

In this case, the least margin area LM3 of the second dummy pattern does not intersect the electrically active pattern, and the least margin area LM1 of the electrically active pattern does not intersect the second dummy pattern. A second metal fill in which the second dummy pattern is placed over the second routing track T2 is allowed.

Figure 6:
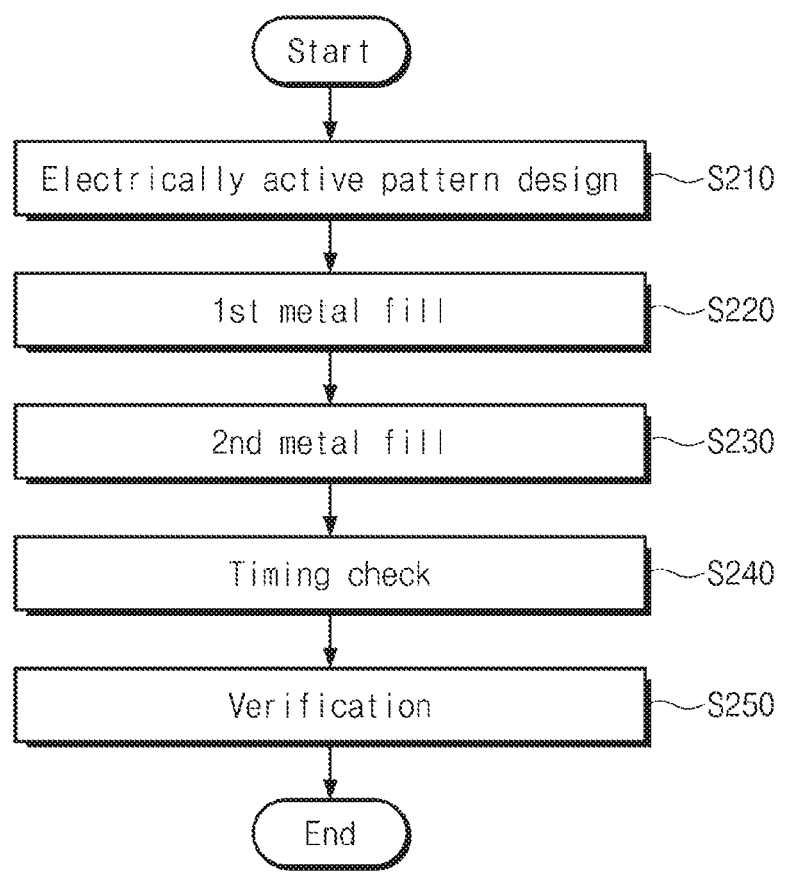
FIG. 6 is a flowchart illustrating a method of designing a layout, according to an example embodiment of inventive concepts.

FIG. 6 is a flowchart illustrating a method of designing a layout, according to an example embodiment of inventive concepts. In an embodiment, the embodiment of FIG. 6 shows operation S120 of FIG. 1 in detail. For better understanding, a description will be given with reference to FIGS. 2A to 5 together.

In operation S210, an electrically active pattern may be designed. The electrically active pattern may be automatically designed by the layout design tool.

In operation S220, a first metal fill may be performed. Likewise, the first metal fill may be automatically performed by the layout design tool. The first metal fill may be executed when a metal density of a specific layer is not within a desired range, for example, when the metal density is smaller than a reference value. For example, the first metal fill may be performed by using a first dummy pattern, the width of which is greater than a width of the electrically active pattern.

In operation S230, a second metal fill may be performed. As in the above description, the second metal fill may be automatically performed by the layout design tool or may be manually performed. The second metal fill may be additionally executed when a metal density of a specific layer is not within a desired range even though the first metal fill is performed. For example, the second metal fill may be performed by using a second dummy pattern, the width of which is smaller than the width of the first dummy pattern and is the same as or larger than the width of the electrically active pattern.

In operation S240, a timing of an electrical signal passing through the electrically active pattern may be checked. For example, in the case where a metal density of a layer changes due to the first metal density, the timing of the electrical signal flowing through the electrically active pattern may be affected. Whether an electrical signal having an undesirable timing is detected may be checked in operation S240; if desired (or necessary), the electrically active pattern may be again designed in operation S210.

The designed layout may be verified in operation S250. As described with reference to FIG. 1, the verification operation may include the DRC for verifying whether a layout is properly set to correspond to a design rule, the ERC for verifying whether a layout is properly connected to each other without electrical disconnection, the LVS for determining a layout is matched with a gate-level netlist, etc.

FIGS. 7 to 11 are views illustrating the process of designing a layout of a semiconductor device by using a layout design tool according to an example embodiment of inventive concepts.

In FIG. 2, a least margin area of the electrically active pattern is described as an area that is defined by moving four sides of an electrically active pattern in left, right, up, and down directions by "d1", and a least margin area of a second dummy pattern is described as an area that is defined by moving four sides of the second dummy pattern in left, right, up, and down directions by "d3". However, in the embodiment of FIGS. 7 to 11, each of least margin areas of second dummy patterns M31, M32, M34, and M35 are assumed to be in an area that is defined by moving four sides of the corresponding dummy pattern in left, right, up, and down directions by "d1", and a least margin area of a second dummy pattern M33 is an area that is defined by moving four sides of the second dummy pattern in left, right, up, and down directions by "d3". However, a width of each of the second dummy patterns M31, M32, M34, and M35 is assumed to be the same as the width w1 of the electrically active pattern, and a width of the second dummy pattern M33 is the same as or larger than the width w1 of the electrically active pattern and is smaller than the width of each of first dummy patterns M21 to M24.

Figure 7:
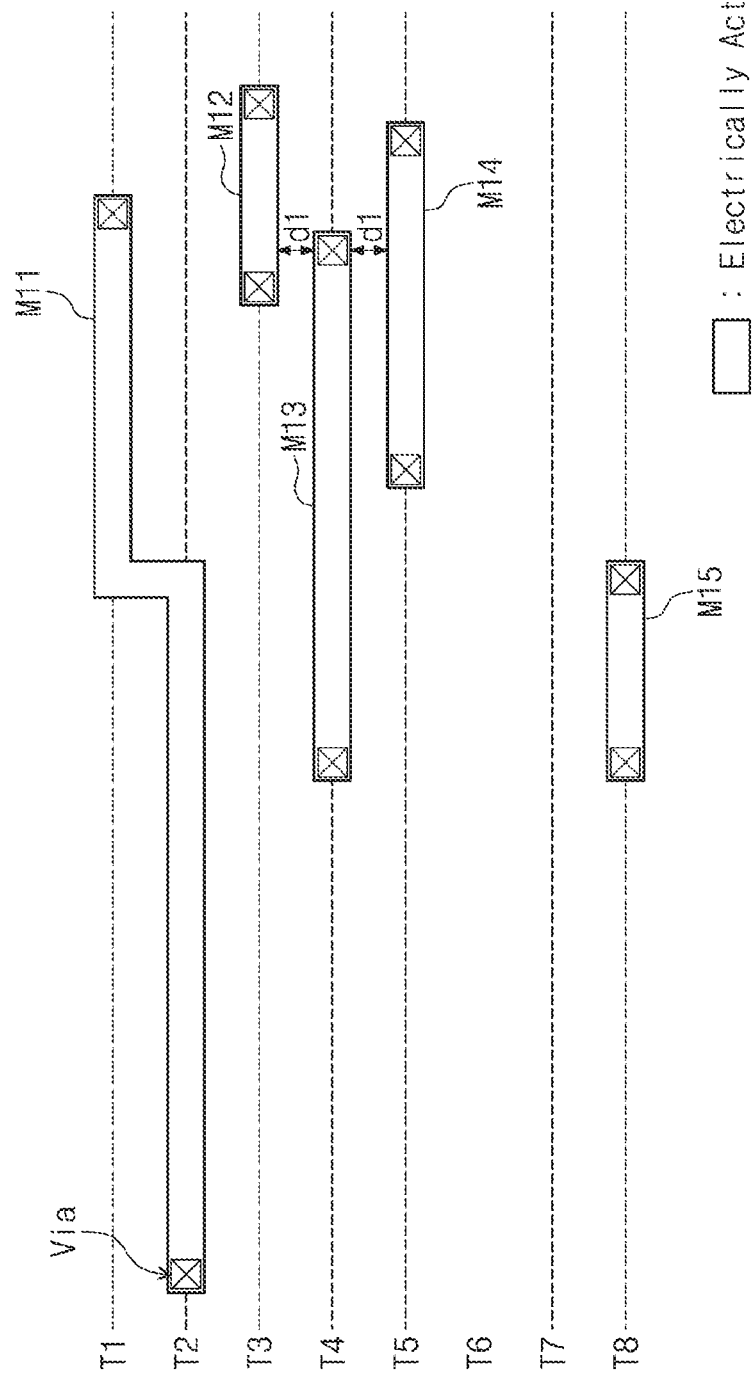
FIGS. 7 to 11 are views illustrating the process of designing a layout of a semiconductor device by using a layout design tool according to an example embodiment of inventive concepts.

Referring to FIG. 7, electrically active patterns M11 to M15 are placed along routing tracks T1 to T7 by using the layout design tool. The electrically active patterns M11 to M15 may be placed to maintain a distance of at least "d1" or greater, depending on a least margin condition. In addition, one or more vias, through which an electrical signal is input and output, may be formed in each electrically active pattern. The vias may be used to electrically connect the electrically active patterns M11 to M15 with electrically active patterns of an upper or lower layout.

Afterwards, a search operation may be performed to find a portion where a metal density of a desired range is not satisfied. For example, the layout design tool may divide a specific layer of a semiconductor device into a plurality of areas and may determine whether each area satisfies a metal density of a desired range. In an example embodiment, the layout illustrated in FIG. 7 is assumed to not satisfy a metal density of a desired range.

Figure 8:
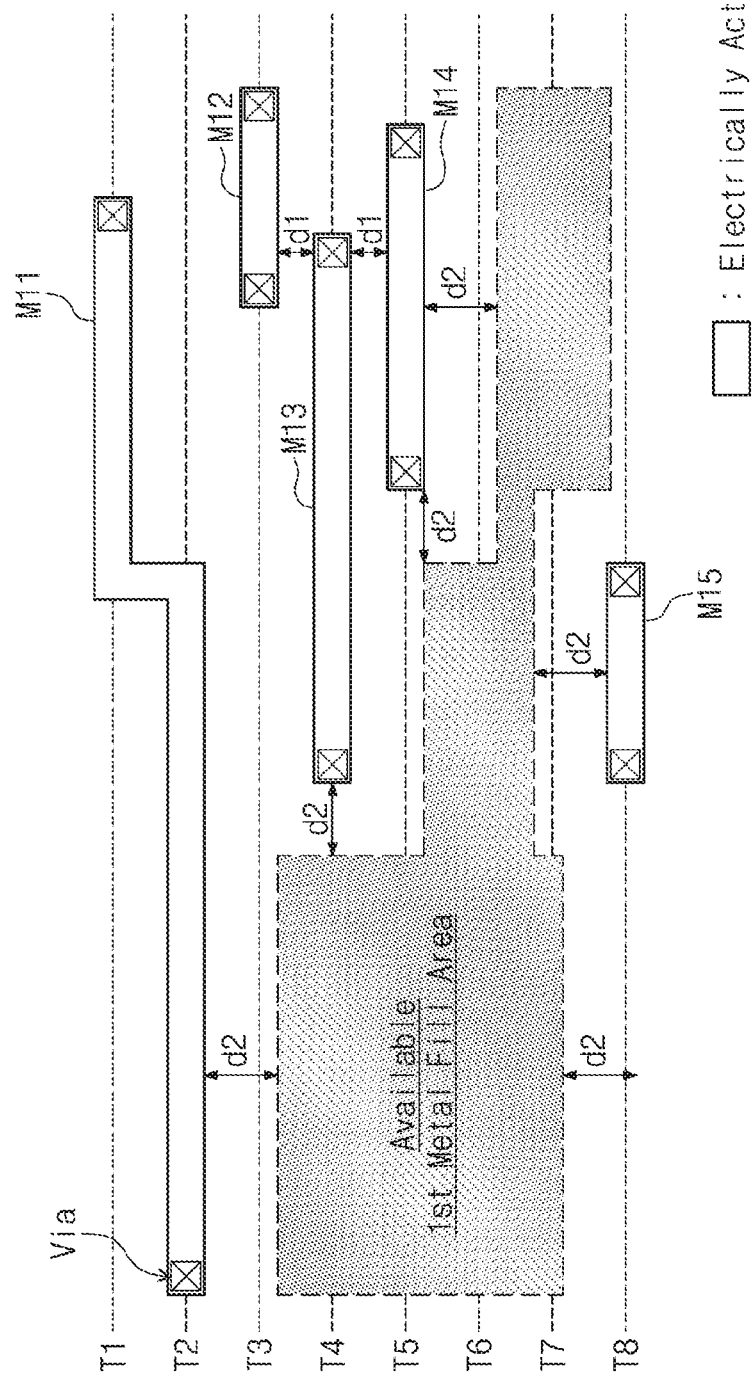

Referring to FIG. 8, a first metal fill area that is available may be calculated. In consideration of a least margin condition of a first dummy pattern (refer to FIGS. 2A and 2B) used in the first metal fill, as illustrated in FIG. 8, the first metal fill area that is available may be spaced apart from surrounding electrically active patterns (e.g., M11, M13, M14, and M15) by "d2".

Figure 9:
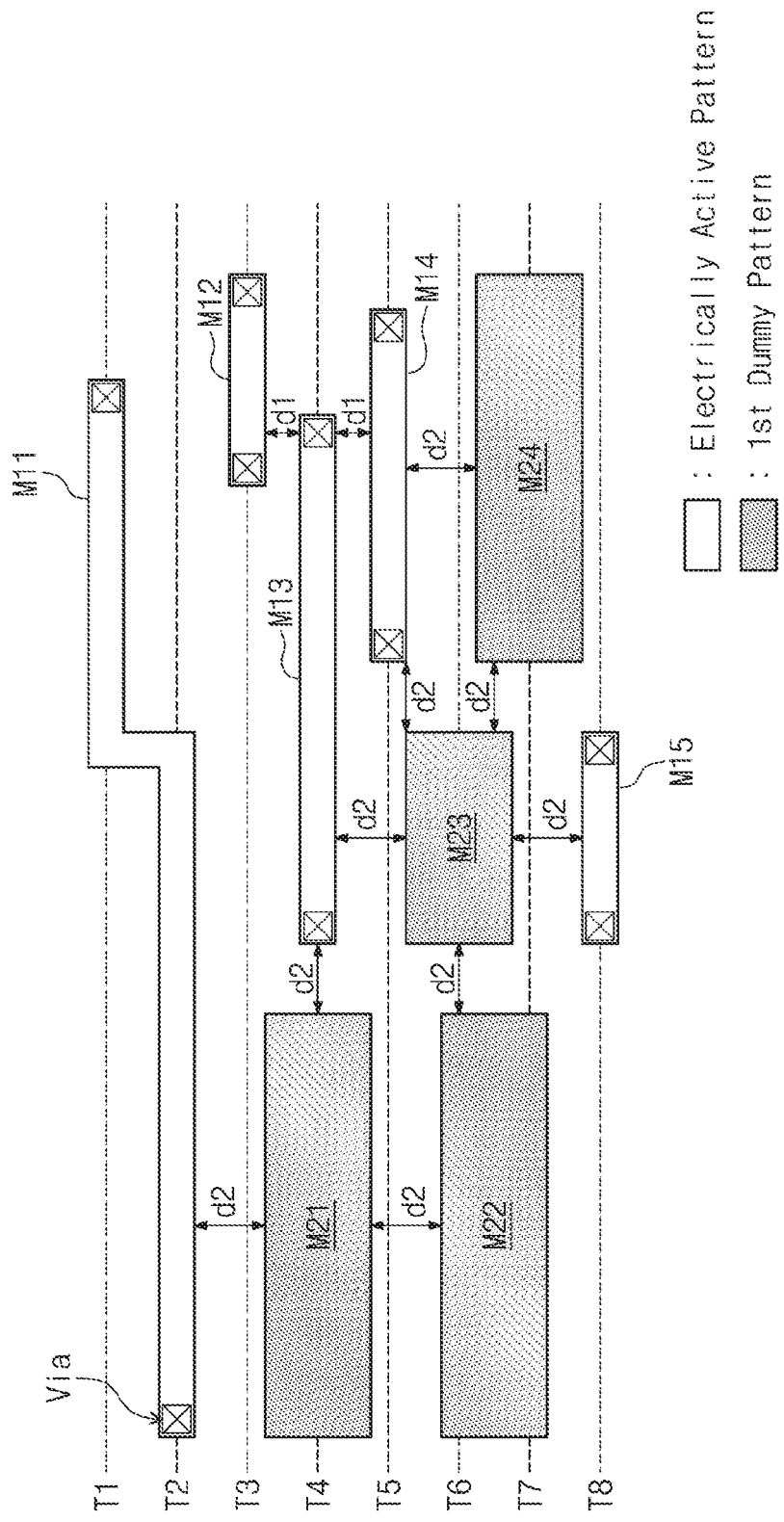

Referring to FIG. 9, as the first metal fill is executed, the first dummy patterns M21 to M24 may be appropriately placed within the first metal fill area that is available. For example, a plurality of first dummy patterns may be placed within the first metal fill area, and dummy patterns that are adjacent to each other may be spaced apart from each other by "d2" to satisfy the least margin condition. As described with reference to FIGS. 2A and 2B, each of the first dummy patterns M21 to M24 may have the width "w2" larger than the electrically active pattern and may be placed over at least one track or two or more tracks.

However, since an area where a first dummy pattern is placed is limited due to the wide width "w2" of the first dummy pattern, a metal fill condition may not be satisfied even after the first metal fill. In this case, the second metal fill according to inventive concepts may be additionally performed.

Figure 10:
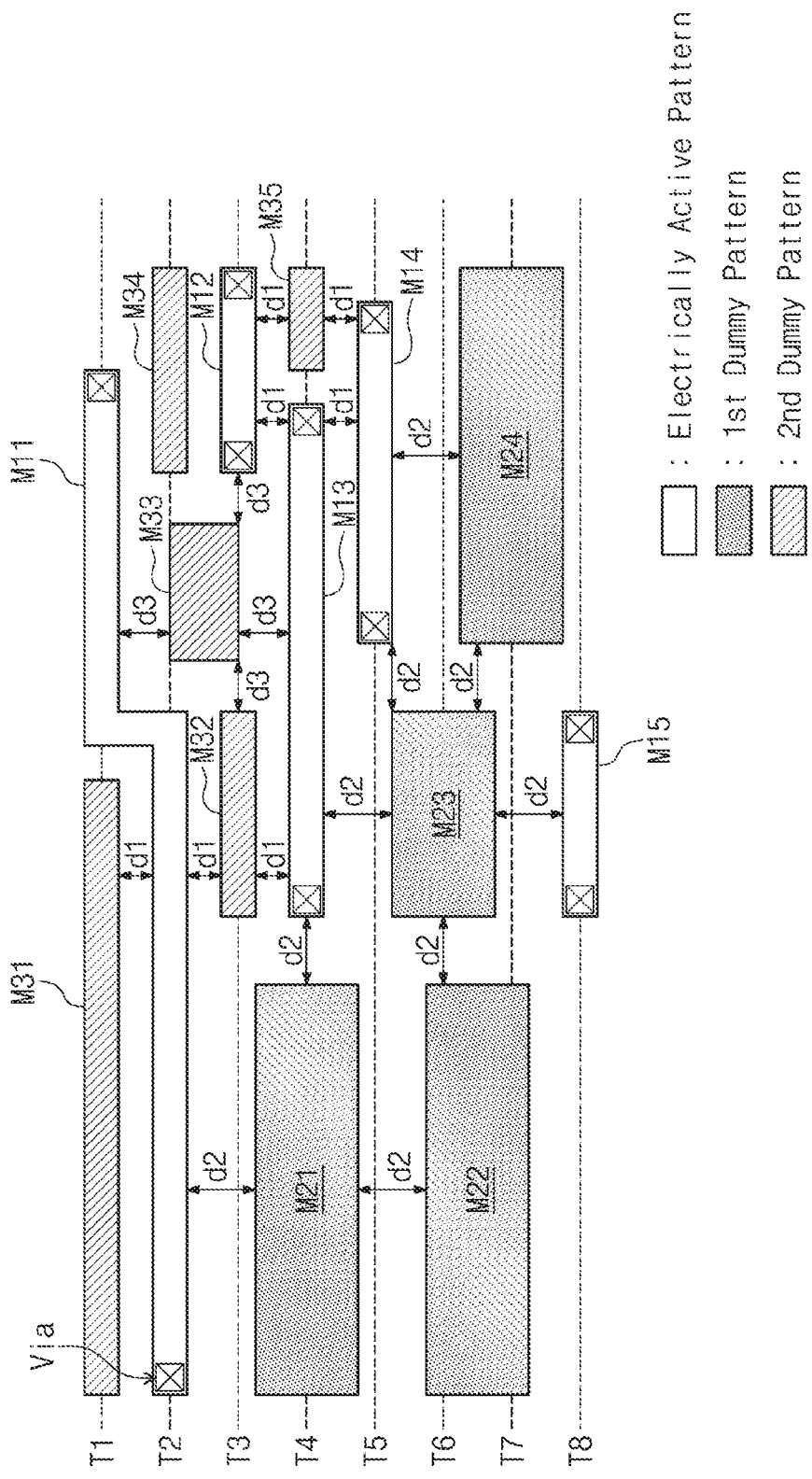

Referring to FIG. 10, as the second metal fill is executed, the second dummy patterns M31 to M35 may be appropriately placed. For example, the second dummy patterns M31 to M35 may be appropriately placed between an electrically active pattern and an electrically active pattern, and/or between an electrically active pattern and a first dummy pattern. Each of the second dummy patterns M31 to M35 may be placed to satisfy a least margin condition with an electrically active pattern or first dummy pattern, which is adjacent thereto.

Meanwhile, even though the second metal fill is additionally executed, a specific area (e.g., an area including the layout illustrated in FIG. 10) of the plurality of areas of the layer thus divided may not still satisfy the metal density condition. In this case, addition placement may be performed as illustrated in FIG. 11.

Figure 11:
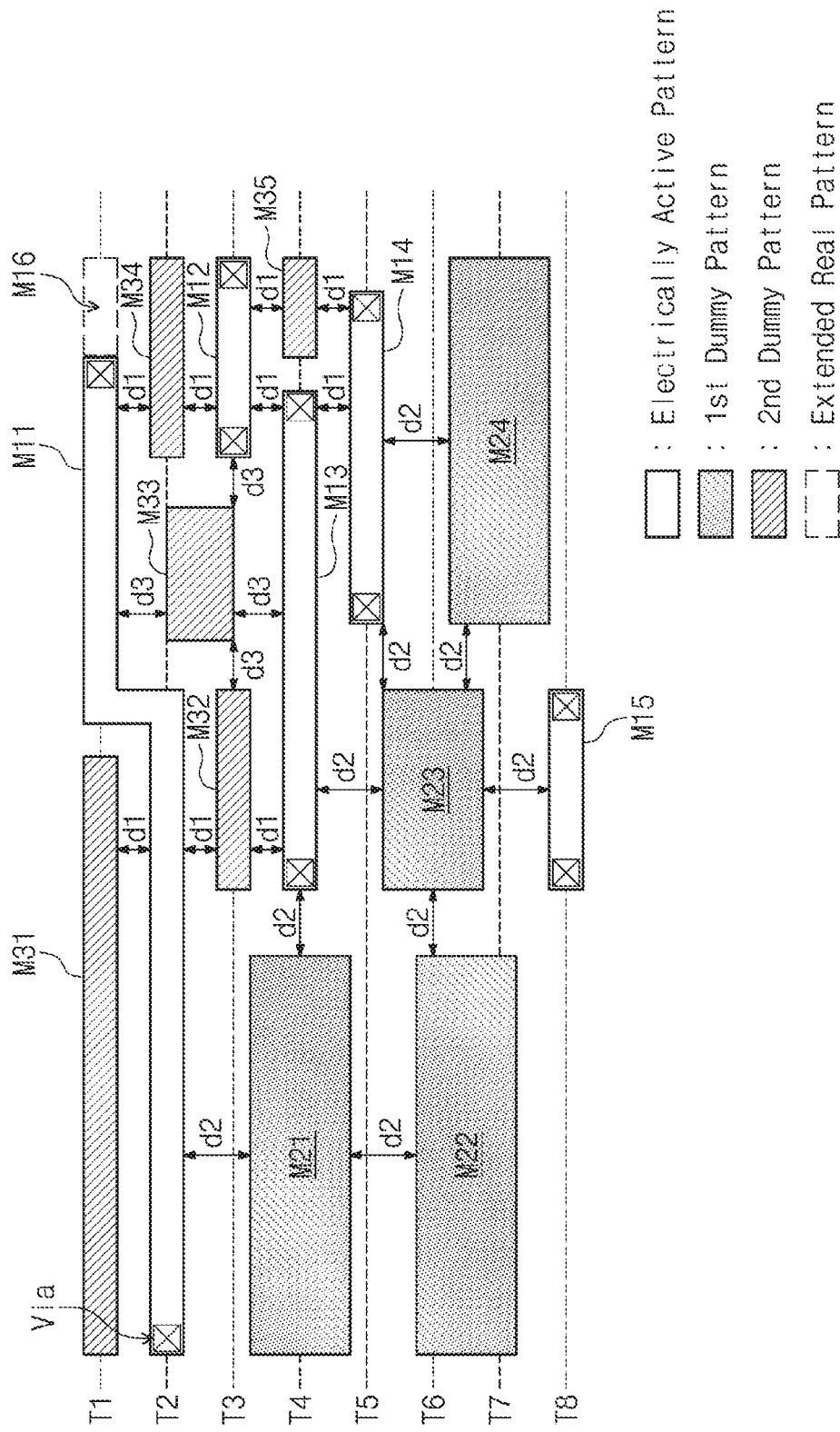

Referring to FIG. 11, one end of the electrically active pattern M11 may be extended. The extended electrically active pattern is marked by "M16". The extended electrically active pattern M16 may be placed only when the least margin condition is satisfied with regard to surrounding patterns.

According to the layout design method described with reference to FIGS. 7 to 11, the second dummy patterns, each of which has a smaller width than the first dummy pattern used in general, are selectively used. Therefore, as semiconductor devices are miniaturized, more adaptively coping with the case where the metal density condition is not satisfied may be possible, even though the first metal fill is executed.

In particular, like an existing method, in the case where the metal density condition is not satisfied even though a metal fill is performed, in the worst case, an electrically active pattern should be re-designed. In this case, since design steps and verification steps are accompanied, a time taken to design a layout unnecessarily increases. However, according to inventive concepts, avoiding additional design and verification steps may be possible by performing the second metal fill additionally. That is, the layout design method of inventive concepts may improve the performance/function of the layout design tool itself.

Figure 12:
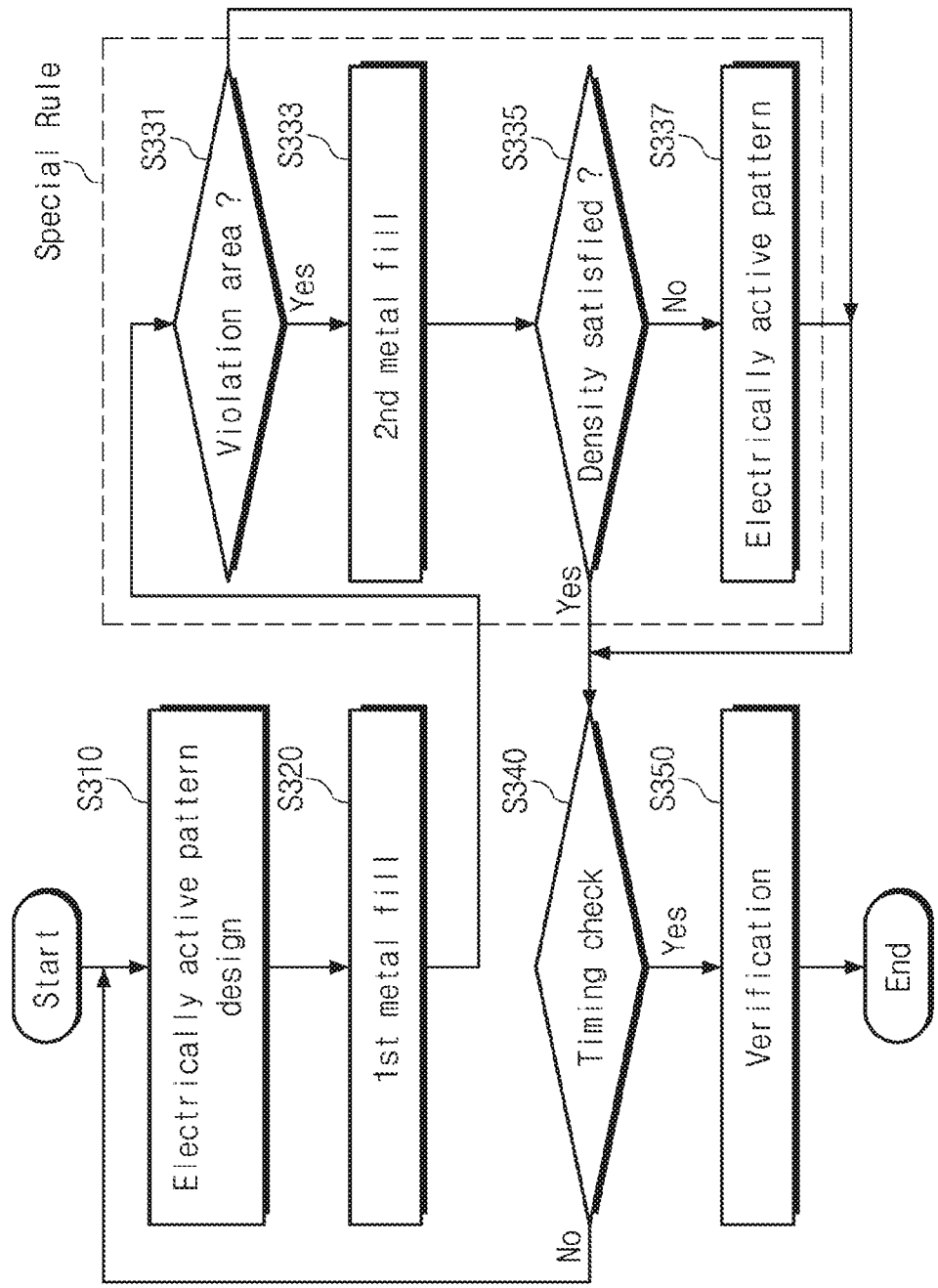
FIG. 12 is a flowchart illustrating a method of designing a layout, according to an example embodiment of inventive concepts.

FIG. 12 is a flowchart illustrating a method of designing a layout, according to an example embodiment of inventive concepts. For better understanding, a description will be given with reference to FIGS. 7 to 11 together.

In operation S310, the electrically active patterns M11 to M15 may be appropriately placed along routing tracks. Two adjacent electrically active patterns of the electrically active patterns M11 to M15 may be placed to maintain a distance of at least "d1", thus satisfying a least margin condition.

In operation S320, a first metal fill may be performed. The first metal fill may be accomplished by appropriately placing a first dummy pattern having the width "w2" within an available first metal fill area.

In operation S331, whether an area where the metal density condition is not satisfied is detected. As described above, a specific layer may be divided into a plurality of areas, and whether to satisfy the metal density condition may be determined with respect to each of the plurality of areas. If an area where the metal density condition is not satisfied is absent (No), operation S340 is executed. In contrast, if an area where the metal density condition is not satisfied is present (Yes), operation S333 is executed.

In operation S333, a second metal fill is executed with respect to the area where the metal density condition is not satisfied. The second metal fill may be accomplished by alternatively placing the second dummy patterns M31 to M35 between electrically active patterns, between an electrically active pattern and a first dummy pattern, and/or between first dummy patterns. The least margin condition may be satisfied upon placing the second dummy patterns M31 to M35.

In operation S335, whether the metal density condition is satisfied is determined. If it is determined that the metal density is within a range that a semiconductor manufacturer wants (Yes), operation S340 is executed. If not (No), operation S337 is executed.

In operation S337, an electrically active pattern may be extended. For example, like the extended electrically active pattern M16 illustrated in FIG. 11, the electrically active pattern may be extended within a range where a least margin condition associated with surrounding patterns is satisfied.

In operation S331 to operation S337 described above, since a metal fill suitable for a miniaturized semiconductor manufacturing process is adaptively performed (i.e., a special rule), an issue due to an existing metal fill upon designing a layout of a semiconductor device may be improved or solved.

In operation S340, a timing may be checked. In the case where an electrical signal having an undesirable timing due to is detected (No), operation S310 is again executed. That is, to adjusting a timing of an electrical signal passing through an electrically active pattern may be difficult or impossible only by again placing a dummy pattern. Therefore, electrically active patterns are again designed by the layout design tool.

In operation S350, the layout designed through operation S310 to operation S340 may be verified. The verification operation may include verifying whether a layout is properly set to correspond to a design rule, verifying whether a layout is properly connected to each other without electrical disconnection, determining whether a layout is matched with a gate-level netlist, etc.

Figure 13:
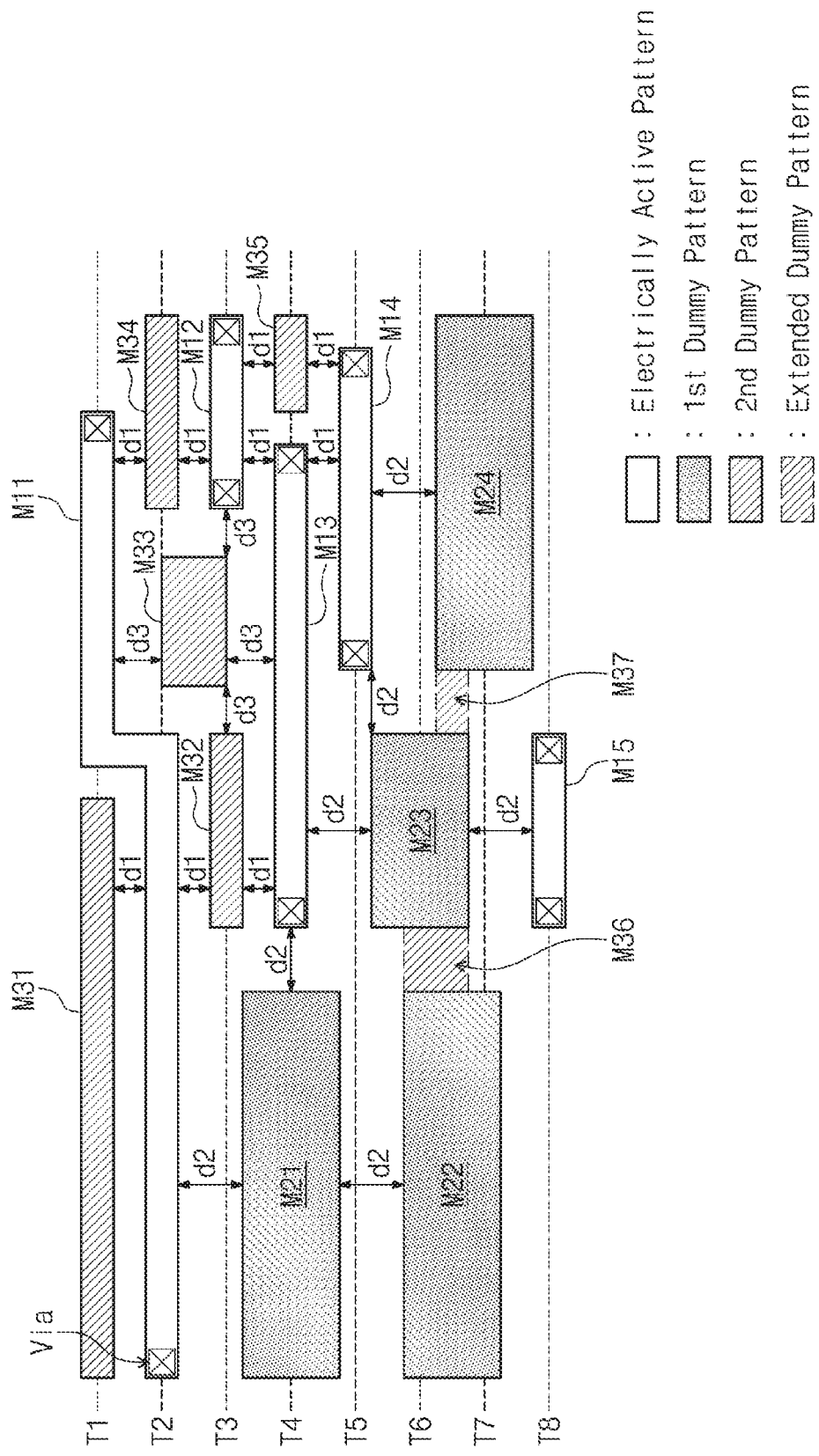
FIG. 13 is a view illustrating a layout design additionally executed after a second metal fill, to satisfy a metal density condition.

Meanwhile, unlike illustration of FIG. 11, in the case where the metal density condition is not satisfied even after the second metal fill, any other method using the layout design tool may be considered instead of extending an electrically active pattern. An example of the method is illustrated in FIG. 13. FIG. 13 is a view illustrating a layout design additionally executed after a second metal fill, to satisfy the metal density condition.

Referring to FIG. 13, extended dummy patterns M36 and M37 that are additionally placed are illustrated. To satisfy the metal density condition, the extended dummy patterns M36 and M37 may be placed at opposite ends of a dummy pattern or may be placed between adjacent dummy patterns. An example embodiment is illustrated in FIG. 13 as the extended dummy pattern M36 connecting the first dummy patterns M22 and M23 adjacent to each other is placed and the extended dummy pattern M37 connecting the first dummy patterns M23 and M24 adjacent to each other is placed.

Alternatively or additionally, in other embodiments, an extended dummy pattern may be placed between a first dummy pattern and a second dummy pattern and/or may be placed between second dummy patterns. Even in this case, a least margin condition may be satisfied with regard to the extended dummy pattern.

In addition, in the embodiment illustrated in FIG. 13, only the extended dummy patterns M36 and M37 are illustrated, but the extended dummy patterns M36 and M37 may be placed together with the extended electrically active pattern M16 illustrated in FIG. 11. In addition, a pattern may be place, the pattern being appropriately selected by the layout design tool from among the extended dummy patterns M36 and M37 and the extended electrically active pattern M16 may be placed.

Figure 14:
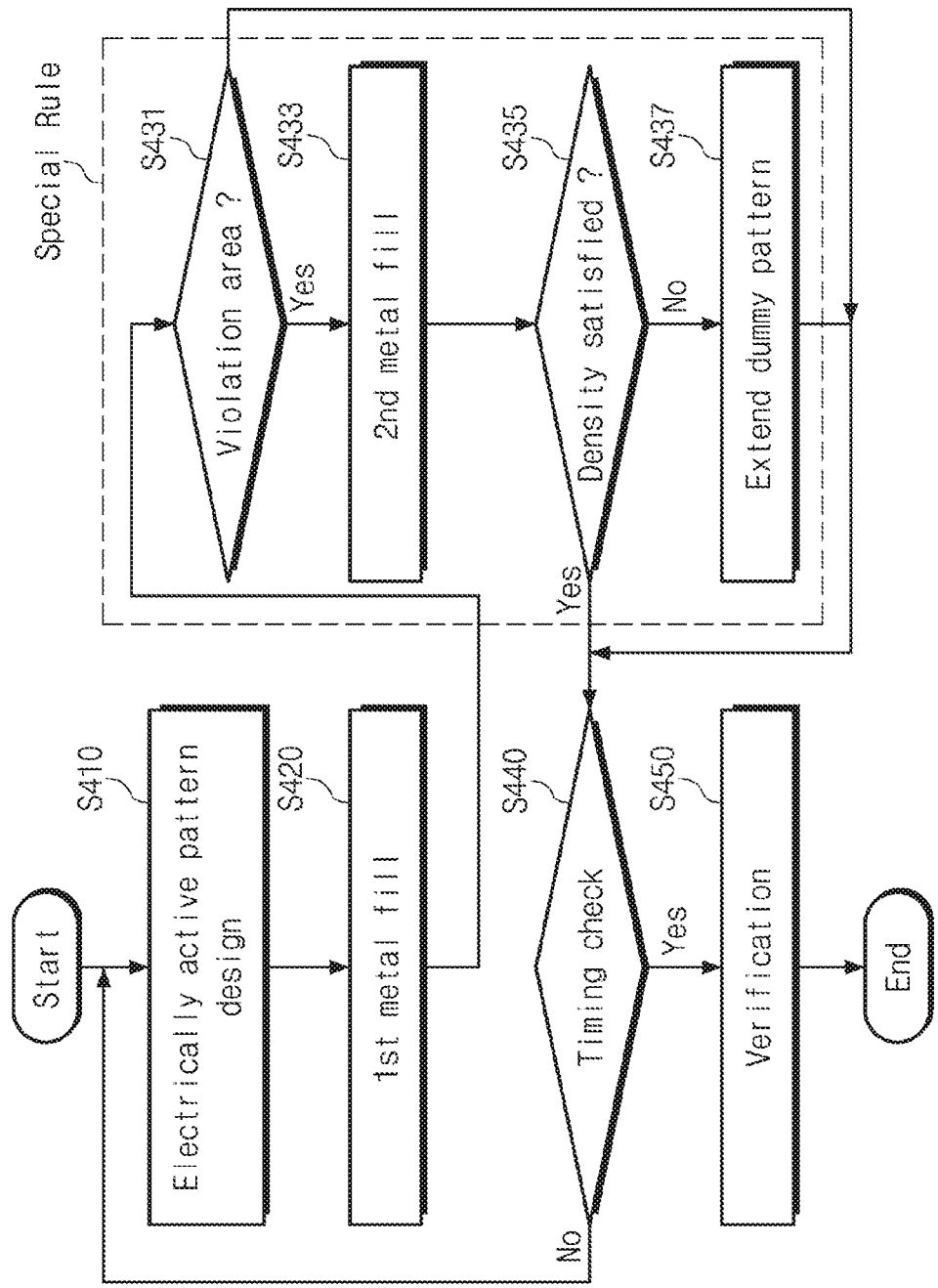
FIG. 14 is a flowchart illustrating a method of designing a layout, according to an example embodiment of inventive concepts.

FIG. 14 is a flowchart illustrating a method of designing a layout, according to an example embodiment of inventive concepts. The embodiment of FIG. 8 is mostly similar to the embodiment of FIG. 12. Below, a difference will be mainly described. For better understanding, a description will be given with reference to FIG. 12 together.

Even though electrically active patterns, first dummy patterns, and second dummy patterns are placed according to an example embodiment of inventive concepts, the case that the metal density condition is not satisfied may still occur. In this case (No of operation S435), operation S437 is executed. In operation S437, the layout design tool may detect whether an extendable area among dummy patterns exists. The layout design tool may place an extended dummy pattern in the extendable area. As such, at least two or more first dummy patterns may be connected to each other by the extended dummy patterns M22 and M23.

Meanwhile, a description is given in the above embodiments as the second metal fill is executed when a metal fill condition is not satisfied even after the first metal fill. In this case, a description is given as all the first dummy patterns placed upon performing the first metal fill have the given width (i.e., "w2"), but the exception for the rule may exist. This will be described with reference to FIG. 15.

Figure 15:
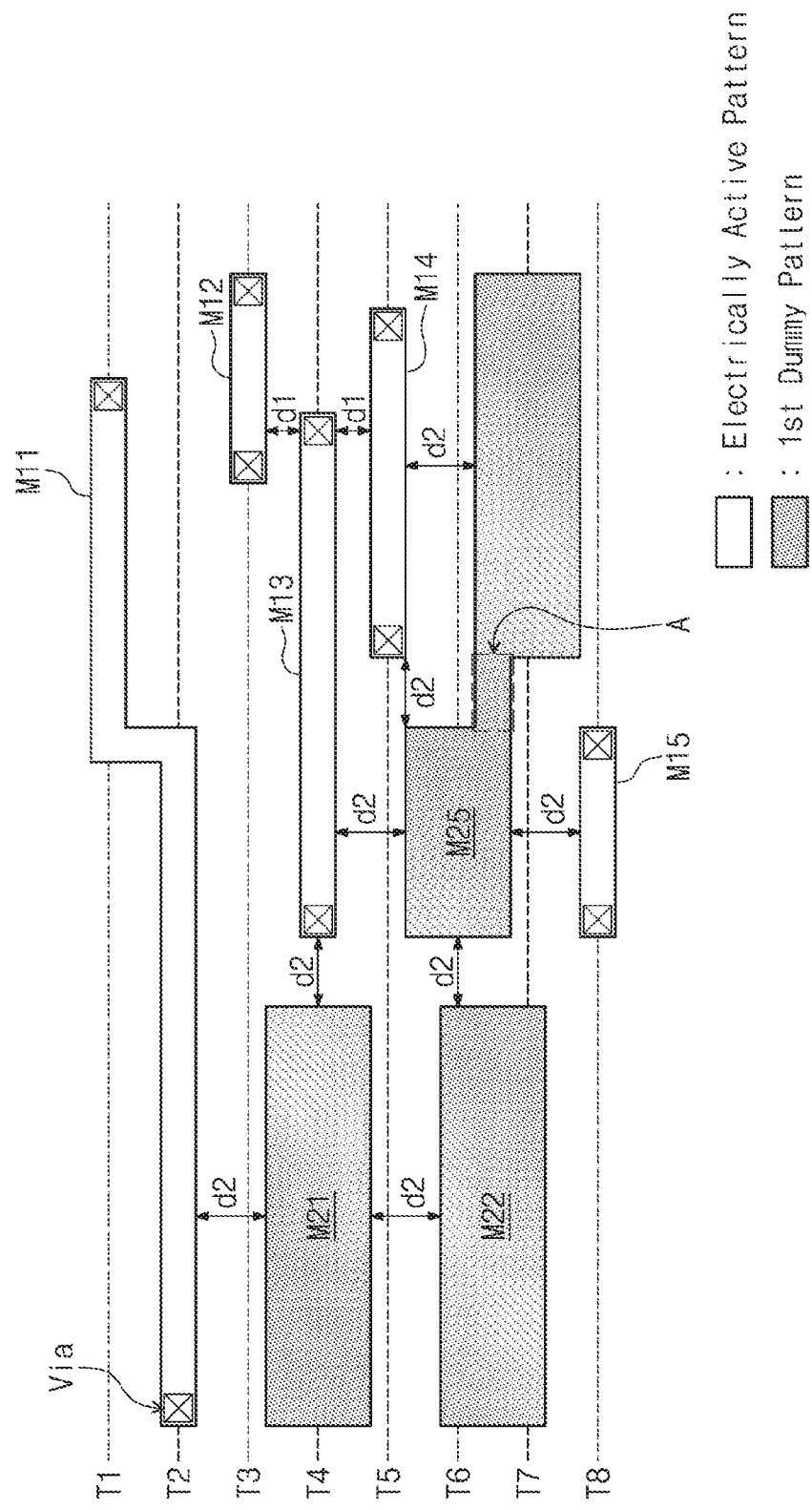
FIG. 15 is a view illustrating how a layout of a semiconductor device is designed by using a layout design tool according to an example embodiment of inventive concepts.

FIG. 15 is a view illustrating how a layout of a semiconductor device is designed by using a layout design tool according to an example embodiment of inventive concepts. For example, the embodiment of FIG. 15 may be implemented after a first metal fill area available by the layout design tool is determined in FIG. 8. In other words, the embodiment of FIG. 15 may be implemented instead of the first metal fill illustrated in FIG. 9.

Referring to FIG. 15, after the available first metal fill area is determined, the layout design tool may form the first dummy patterns M21, M22, and M25. However, unlike the embodiment of FIG. 9, the layout design tool may form the first dummy pattern M25 corresponding to a combination of the first dummy patterns (i.e., M23 and M24 of FIG. 9). The first dummy pattern M25 may violate a rule of performing a general first metal fill. That is, all the first dummy patterns may not have the given width "w2". For example, like area "A" illustrated in FIG. 15, an area having a width smaller than "w2" may exist.

However, the first dummy pattern M25, in which the first and second dummy patterns M23 and M24 of FIG. 9 are connected, may be an example. In other embodiments, the first dummy patterns M21 and M22 may be connected to each other, or the first dummy patterns M22 and M23 may be connected to each other. Afterwards, the second metal fill according to an example embodiment of inventive concepts may be performed.

Meanwhile, a description is given in FIGS. 6 to 15 as the first metal fill is performed by using first dummy patterns having the largest size being insertable and then the second metal fill is performed. However, as will be described below, a metal fill may be performed in a manner different from the above manner.

Figure 16:
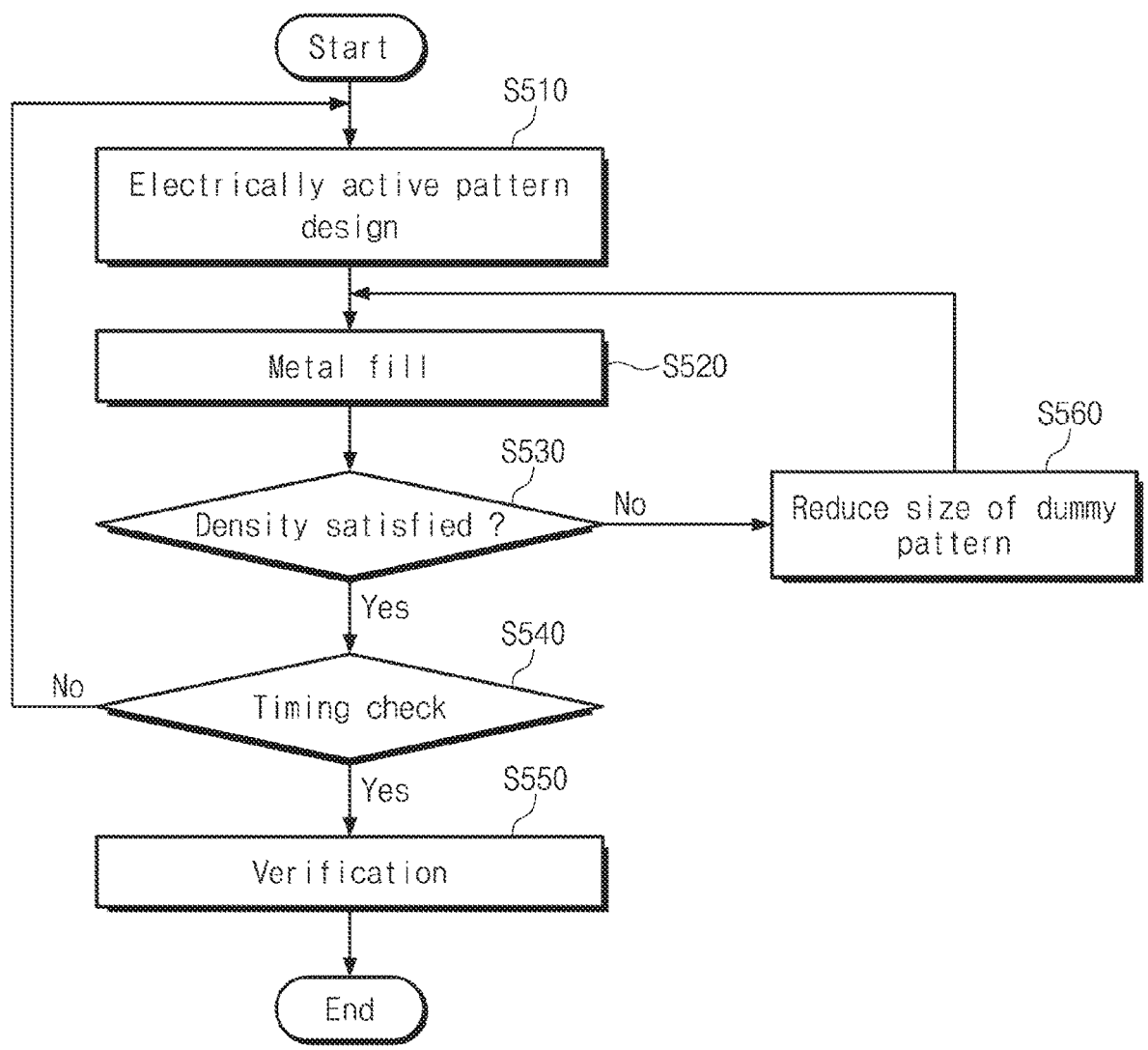
FIG. 16 is a flowchart illustrating a method of designing a layout, according to an example embodiment of inventive concepts.

FIG. 16 is a flowchart illustrating a method of designing a layout, according to an example embodiment of inventive concepts.

In operation S510, an electrically active pattern may be designed. In operation S520, a metal fill may be performed. The metal fill performed in operation S520 may be similar to the first metal fill described with reference to FIG. 6. For example, a dummy pattern placed in the layout may be the first dummy pattern illustrated in FIG. 2A.

In operation S530, whether the metal density condition is satisfied is determined. For example, operation S530 may be performed on each of a plurality of areas determined by dividing a specific layer. If it is determined that an area where the metal density condition is not satisfied does not exist (Yes), timing check (S540) and verification (S550) are performed on the designed layout.

In contrast, if it is determined that an area where the metal density condition is not satisfied exists (No), a metal fill may be additionally performed on the area where the metal density condition is not satisfied. To this end, the size of a dummy pattern to be placed additionally may be reduced by one size (S560). Here, one size may mean a grid unit, e.g., the minimum unit of a resolution, upon designing a layout by using the layout design tool.

As the size of dummy patterns is reduced (i.e., as operation S520, operation S530, and operation S540 are repeatedly executed), a space where a dummy pattern of the reduced size may be placed may increase. The reason is that the least margin area becomes smaller as the size of a dummy pattern is reduced.

As such, compared with the embodiment of FIG. 13 where the first dummy patterns M21, M22, M23, and M24 and the second dummy patterns M31, M32, M33, M34, and M35 have only three different widths, in the case of the embodiment of FIG. 16, dummy patterns having various widths more and more may be placed in a layout. Therefore, a metal fill that may be additionally accompanied when a metal density is not satisfied may be performed more flexibly.

Figure 17:
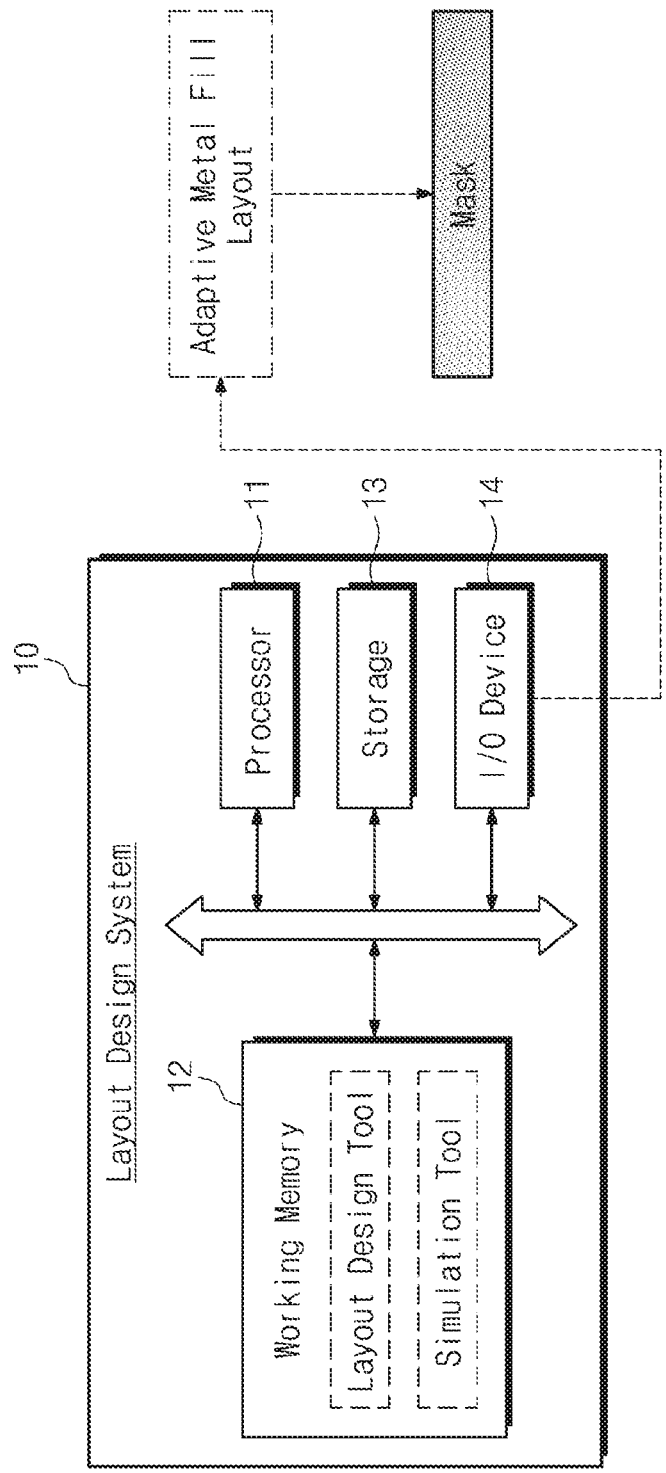
FIG. 17 is a block diagram illustrating a layout design system for designing a semiconductor device, according to an example embodiment of inventive concepts.

FIG. 17 is a block diagram illustrating a layout design system for designing a semiconductor device, according to an example embodiment of inventive concepts. Referring to FIG. 17, a layout design system 10 may include at least one processor 11, a working memory 12, storage 13, and an input/output device 14. Here, the layout design system 10 may be provided as a dedicated device for designing a layout of a semiconductor device according to an example embodiment of inventive concepts. The layout design system 10 may be configured to drive various design and verification simulation programs.

The processor 11 may execute software (e.g., an application program, an operating system, and a device driver) to be executed in the layout design system 10. The processor 11 may execute an operating system OS loaded to the working memory 12. The processor 11 may execute various application programs to be driven based on the operating system OS. The processor 11 may execute the layout design tool loaded to the working memory 12 from the storage 13.

The operating system OS or the application programs may be loaded to the working memory 12. Upon booting the layout design system 10, an OS image stored in the storage 13 may be loaded to the working memory 12 depending on a booting sequence. Overall input/output operations of the layout design system 10 may be supported by the operating system OS. Likewise, application programs that are selected by a user or are used to provide a basic service may be loaded to the working memory 12. In particular, the layout design tool for designing a layout, according to an example embodiment of inventive concepts, may be loaded from the storage 13 to the working memory 12.

The layout design tool may include a biasing function for changing forms and locations of specific layout patterns so as to be different from those defined by a design rule. The layout design tool may perform design rule check (DRC) under the changed biasing data condition. The working memory 12 may include a volatile memory such as a static random access memory (SRAM) or a dynamic random access memory (DRAM). However, inventive concepts is not limited thereto.

A simulation tool that performs optical proximity correction (OPC) on data associated with the designed layout may be further loaded to the working memory 12.

The storage 13 is provided as a storage medium of the layout design system 10. The storage 13 may store the application programs, the OS image, and various kinds of data. In particular, the storage 13 may store the layout design tool according to an example embodiment of inventive concepts.

The layout design tool that performs the second metal fill of inventive concepts may be a computer program product including a computer-readable program code or may be a computer program product including a non-transitory computer-readable medium. Additionally or alternatively, the layout design tool that performs the second metal fill of inventive concepts may be a product that is downloadable on the Internet.

For example, the storage 13 may be implemented with a solid state drive (SSD), an embedded multimedia card (eMMC), or a hard disk drive (HDD). The storage 13 may include, but is not limited to, a NAND flash memory. For example, the storage 13 may include a nonvolatile memory such as a phase change RAM (PRAM), a magnetic RAM (MRAM), a resistive RAM (ReRAM), or a ferroelectric RAM (FRAM).

The input/output device 14 may include various devices, which may be provided with information from a designer or may provide information to the designer, such as a keyboard, a mouse, and a monitor. For example, a processing procedure and a processed result of the layout design tool and the simulation tool may be displayed through the input/output device 14.

In particular, an adaptive metal fill layout formed according to embodiments of inventive concepts may be provided through the input/output device 14. The adaptive metal fill layout may be formed based on the first metal fill and the second metal fill. Additionally, the adaptive metal fill layout may be formed based further on follow-up measures illustrated in FIGS. 11, 13, and 15. A mask may be generated by mask generation equipment based on the adaptive metal fill layer, and an actual layout of a semiconductor device may be patterned based on the mask.

Figure 18:
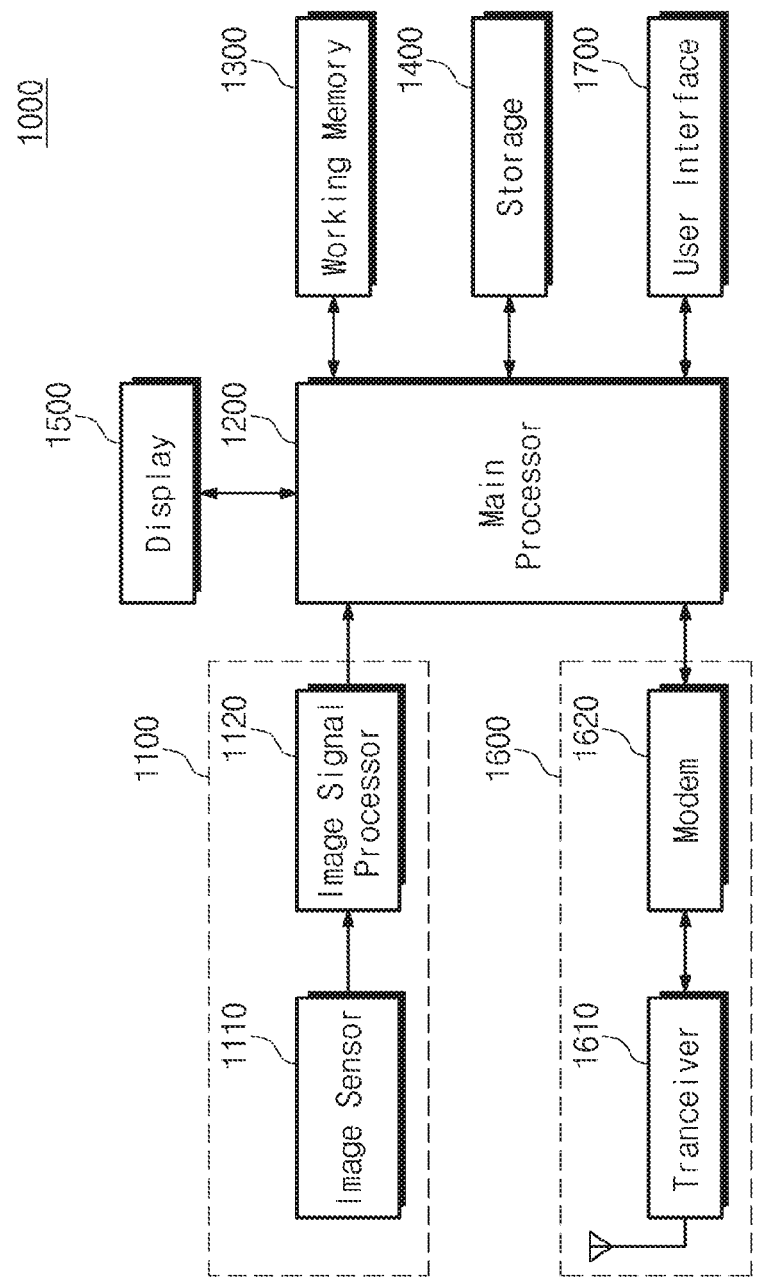
FIG. 18 is a block diagram illustrating an electronic device manufactured by a layout formed according to an example embodiment of inventive concepts.

FIG. 18 is a block diagram illustrating an electronic device manufactured by a layout formed according to an example embodiment of inventive concepts. For example, an electronic device 1000 may be implemented with a smartphone, a tablet computer, a desktop computer, a laptop computer, or a wearable device.

The electronic device 1000 may include an image processing device 1100, a main processor 1200, a working memory 1300, storage 1400, a display 1500, a communication block 1600, and a user interface 1700.

The image processing device 1100 may include an image sensor 1110 for photographing an image and an image processor 1120 for processing the photographed image.

The main processor 1200 may control overall operations of the electronic device 1000. The main processor 1200 may drive an operating system OS that is based on a file system. The main processor 1200 may be implemented solely or may be implemented with a system on chip including the communication block 1600. For example, the main processor 1200 may include an application processor.

The working memory 1300 may temporarily store data that are used for an operation of the computing device 1000. For example, a flash translation layer FTL that defines a mapping relationship between logical addresses and physical addresses of data stored in the storage 1400 may be loaded to the working memory 1300. For example, the working memory 1300 may include a volatile memory, such as a dynamic random access memory (DRAM) a synchronous DRAM (SDRAM), or the like, and/or a nonvolatile memory, such as a phase-change RAM (PRAM), a magneto-resistive RAM (MRAM), a resistive RAM (ReRAM), a ferroelectric RAM (FRAM), and/or the like.

The storage device 1400 may store data. For example, the storage 1400 may include a nonvolatile memory such as a flash memory, a PRAM, an MRAM, a ReRAM, or an FRAM.

The display 1500 may include a display panel and a display serial interface (DSI) peripheral circuit. For example, the display panel may be implemented with various devices such as a liquid crystal display (LCD) device, a light emitting diode (LED) display device, an organic LED (OLED) display device, an active matrix OLED (AMOLED) display device, and the like. A DSI host embedded in the main processor 1200 may perform serial communication with the display panel through a DSI. The DSI peripheral circuit may include a timing controller, a source driver, and the like, which are needed to drive the display panel.

The communication block 1600 may exchange signals with an external device/system through an antenna. A transceiver 1610 and a modulator/demodulator (MODEM) 1620 of the communication block 1600 may process signals exchanged with the external device/system, depending on a wireless communication protocol such as long term evolution (LTE), worldwide interoperability for microwave access (WiMax), global system for mobile communication (GSM), code division multiple access (CDMA), Bluetooth, near field communication (NFC), wireless fidelity (Wi-Fi), or radio frequency identification (RFID).

The user interface 1700 may include at least one of input interfaces such as a keyboard, a mouse, a keypad, a button, a touch panel, a touch screen, a touch pad, a touch ball, a gyroscope sensor, a vibration sensor, and an acceleration sensor.

Components of the electronic device 1000 may exchange data based on one or more of various interface protocols such as a universal serial bus (USB), a small computer system interface (SCSI), peripheral component interconnect express (PCIe), mobile PCIe (M-PCIe), advanced technology attachment (ATA), parallel ATA (PATA), serial ATA (SATA), a serial attached SCSI (SAS), integrated drive electronics (IDE), enhanced IDE (EIDE), nonvolatile memory express (NVMe), and universal flash storage (UFS).

A circuit that is implemented using a mask generated based on a layout, which is formed according to an example embodiment of inventive concepts, may be packaged in various techniques. For example, a circuit implemented based on the layout of inventive concepts may be mounted using a package: package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), small outline (SOIC), shrink small outline package (SSOP), thin small outline (TSOP), thin quad flatpack (TQFP), system in package (SIP), multi-chip package (MCP), wafer-level fabricated package (WFP), or wafer-level processed stack package (WSP).

According to embodiments of inventive concepts, it may be possible to prevent a layout from being again designed unnecessarily as the event that a metal density condition is not satisfied frequently occurs as microfabrication technologies develop.

In addition, according to the embodiments of inventive concepts, a computer program performing an adaptive metal fill and a semiconductor device manufactured by the computer program may be provided.

While inventive concepts has been described with reference to example embodiments thereof, it will be apparent to those of ordinary skill in the art that various changes and modifications may be made thereto without departing from the spirit and scope of inventive concepts as set forth in the following claims.

What is claimed is:

1. A computer-readable medium including a program code that, when executed by a processor, causes the processor to:
    place, on a layer, an electrically active pattern having a first width and a first least margin area;
    place, on the layer, a first dummy pattern having a second width wider than the first width and having a second least margin area;
    in response to a first ratio of an area of the layer to a sum of areas of the electrically active pattern and the first dummy pattern being outside of a reference range, place, on the layer, a second dummy pattern having a third width and a third least margin area; and
    extend the electrically active pattern in response to a second ratio of the area of the layer to a sum of areas of the electrically active pattern, the first dummy pattern, and the second dummy pattern being within the reference range,
    wherein the third width is the same as or wider than the first width and is narrower than the second width.

2. The computer-readable medium of claim 1, wherein a width of the third least margin area is wider than or the same as a width of the first least margin area and is narrower than a width of the second least margin area.

3. The computer-readable medium of claim 1, wherein the program code, when executed, causes the processor to place the second dummy pattern such that the third least margin area does not intersect at least one of the electrically active pattern and the first dummy pattern.

4. The computer-readable medium of claim 1, wherein the program code, when executed, further causes the processor to:
    extend the first dummy pattern in response to a second ratio of the area of the layer to a sum of areas of the electrically active pattern, the first dummy pattern, and the second dummy pattern being within the reference range.

5. The computer-readable medium of claim 1, wherein the program code, when executed, further causes the processor to:
    check a timing of an electrical signal passing through the electrically active pattern; and
    verify a layout of the layer where the electrically active pattern, the first dummy pattern, and the second dummy pattern are formed.

6. The computer-readable medium of claim 5, wherein the verifying includes at least one of design rule check (DRC), electrical rule check (ERC), and layout vs schematic (LVS).

7. The computer-readable medium of claim 1, wherein the electrically active pattern is placed, on the layer, on a first routing track among a plurality of routing tracks,
    wherein the first dummy pattern is placed on second routing tracks including two or more routing tracks among the plurality of routing tracks, and
    wherein the second dummy pattern is placed on any one routing track among the plurality of routing tracks.

8. The computer-readable medium of claim 1, wherein the first least margin area is an area within a first distance from the electrically active pattern,
    wherein the second least margin area is an area within a second distance from the first dummy pattern, and
    wherein the third least margin area is an area within a third distance from the second dummy pattern,
    wherein the third distance is smaller than the second distance and is the same as or greater than the first distance.

9. A method comprising:
    placing, on a layer, an electrically active pattern having a first width and a first least margin area by using a layout design tool;
    placing, on the layer, a first dummy pattern having a second width wider than the first width and having a second least margin area by using the layout design tool;
    placing, on the layer, a second dummy pattern having a third width and a third least margin area, in response to a first ratio of an area of the layer to a sum of areas of the electrically active pattern and the first dummy pattern being outside a reference range by using the layout design tool;
    extending the electrically active pattern based on whether a second ratio of the area of the layer to a sum of areas of the electrically active pattern, the first dummy pattern, and the second dummy pattern is within the reference range;

generating a mask based on a layout including the electrically active pattern, the first dummy pattern, and the second dummy pattern; and manufacturing a semiconductor device by using the mask, wherein the third width is the same as or wider than the first width and is narrower than the second width.

10. The method of claim 9, wherein a width of the third least margin area is the same as or wider than a width of the first least margin area and is narrower than a width of the second least margin area.

11. The method of claim 9, wherein the second dummy pattern is placed such that the third least margin area does not intersect at least one of the electrically active pattern and the first dummy pattern.

12. The method of claim 9, further comprising:
extending the first dummy pattern in response to a second ratio of the area of the layer to a sum of areas of the electrically active pattern, the first dummy pattern, and the second dummy pattern being within the reference range.

13. The method of claim 9, further comprising:
after placing the second dummy pattern,
checking a timing of an electrical signal passing through the electrically active pattern; and
verifying a layout of the layer.

14. A computer-readable medium including a program code that, when executed by a processor, causes the processor to:
place, on a layer, an electrically active pattern having a first width;
place, on the layer, a first dummy pattern having a second width wider than the first width;
determine whether a ratio of an area of the layer to a sum of areas of the electrically active pattern and the first dummy pattern is within a reference range;
extend the electrically active pattern when it is determined in the determining that the ratio is within the reference range; and
place, on the layer, a second dummy pattern having a third width, which is the same as or wider than the first width and is narrower than the second width, in response to the determining.

15. The computer-readable medium of claim 14, wherein an area within a first distance from the electrically active pattern is defined as a first least margin area,
wherein an area within a second distance from the first dummy pattern is defined as a second least margin area, and
wherein an area within a third distance from the second dummy pattern is defined as a third least margin area,
wherein a third width of the third least margin area is the same as or wider than a first width of the first least margin area and is narrower than a second width of the second least margin area.

16. The computer-readable medium of claim 15, wherein the program code, when executed, causes the processor to place the second dummy pattern such that the third least margin area does not intersect the electrically active pattern or the first dummy pattern.

17. The computer-readable medium of claim 15, wherein the program code, when executed, further causes the processor to:
extend the first dummy pattern when determining determines that the ratio is within the reference range.

* * * * *